May 6, 1969     F. H. CARY ET AL     3,442,489

LOW TORQUE BUTTERFLY VALVE

Filed March 3, 1967

INVENTORS
FRANCIS H. CARY
IRVING O. MINER
BY DEZSO SZILAGYI

*Barlow & Barlow*
ATTORNEYS

United States Patent Office 3,442,489
Patented May 6, 1969

3,442,489
LOW TORQUE BUTTERFLY VALVE
Francis H. Cary, North Scituate, Irving O. Miner, Warwick, and Dezso Szilagyi, Cranston, R.I., assignors to The New York Air Brake Company, a corporation of New Jersey
Filed Mar. 3, 1967, Ser. No. 620,326
Int. Cl. F16k 3/06
U.S. Cl. 251—305                    2 Claims

ABSTRACT OF THE DISCLOSURE

A butterfly valve in which the vane shape is altered to reduce the torque required in operating the valve.

BACKGROUND OF THE INVENTION

This invention relates to a butterfly valve that is used for controlling the flow of fluid through a conduit. Simply expressed, a butterfly valve is a flat or lens-shaped disc or rectangle that is pivotally supported along a median axis thereof on a rotatable shaft to cause the vane to move from open to closed position in a conduit. There has been very little published on the operation of a butterfly valve. One of the more recent collections of performance data appeared in Instruments for August 1951 beginning at p. 880. This article points to some of the operating characteristics of a butterfly valve and comes to the conclusion that the maximum value of the torque used to operate the valve depends on the shape and symmetry of the valve vane but that the angle at which the value is attained is little influenced by the shape. All experimenters and users have recognized that, when a vane is moved from the open position toward the closed position, a considerable torque is developed by the fluid reaction on the vane, which torque tends to rotate the vane to closed position. A similar but opposite situation exists when the closed valve is opened, the torque being such as to oppose or resist opening of the valve.

This situation has been in existence some time and is met on a practical basis by sizing the operator for the butterfly valve to a point where these excessive torques can be properly handled. From a cost standpoint it can be recognized that a large operator or motor for the valve can exceed many times the cost of the valve alone. It is, therefore, desirable to reduce the torque that is developed on the valve as much as possible.

SUMMARY

According to the invention, there is provided a discontinuity near one of the edges of the valve vane which discontinuity will convert the velocity head across the leading face of the valve to static pressure. In its simplest form this is achieved by placing a right angular member or a projection on the face of the vane.

Figure 1:
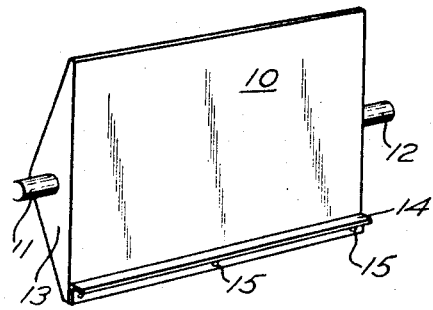
Figure 2:
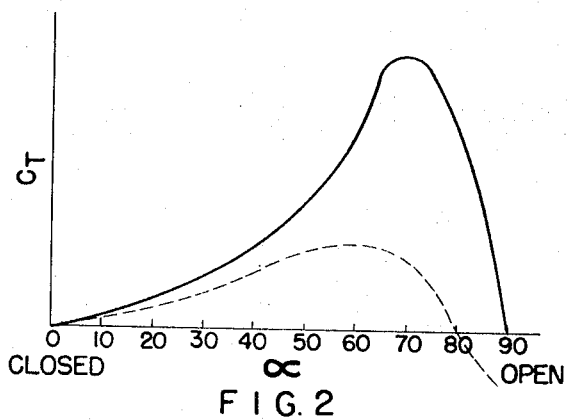
Figure 3:
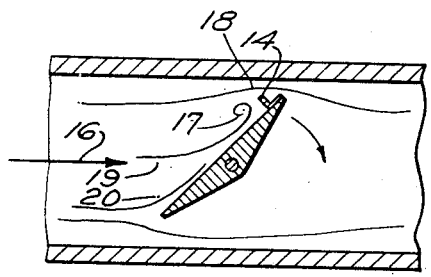
Figure 4:
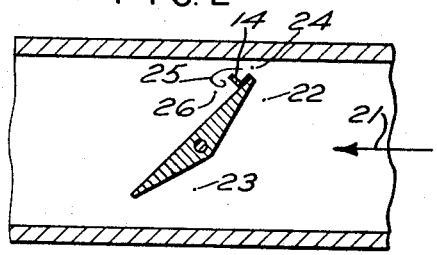
Figure 5:
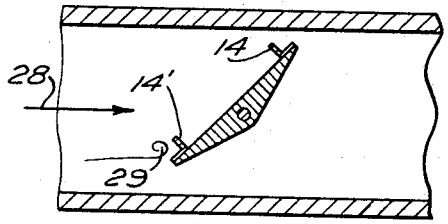
Figure 6:
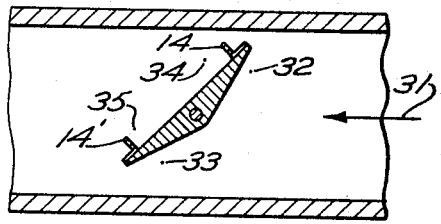
Figure 7:
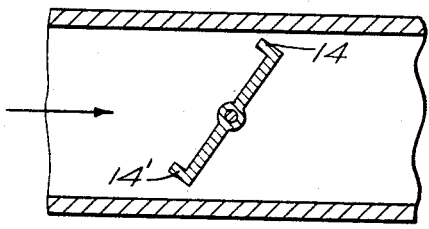
Figure 8:
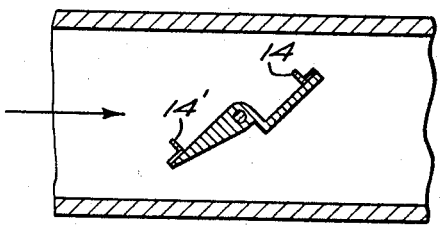
Figure 9:
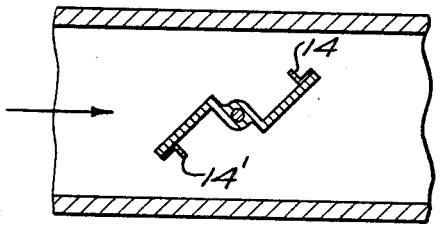
Figure 10:
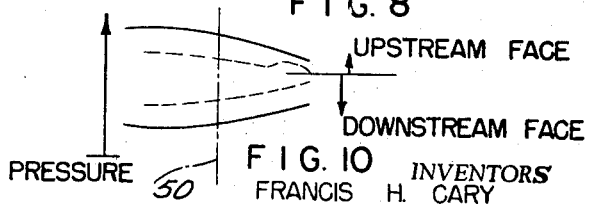

In the accompanying drawings:
FIG. 1 represents a perspective view of a butterfly valve vane made in accordance with the invention;
FIG. 2 is a graph representing the torque relationship that exists in butterfly valves;
FIGS. 3 and 4 are graphical sectional diagrams illustrating the principle of the invention;
FIGS. 5 and 6 are graphical sectional diagrams illustrating the principle of a modified form of the invention;
FIGS. 7, 8 and 9 are graphical sectional diagrams illustrating the principles of further modified forms of the invention; and
FIG. 10 is a diagrammatic view showing pressure distribution.

In FIG. 1 there is shown a typical butterfly valve vane construction in which the vane comprises a main portion shown as being generally rectangular in shape although it should be understood that the outlined shape of the vane is dependent upon the shape of the conduit in which the vane is placed. Thus, this discussion should also consider that the vane may be circular if the conduit is cylindrical. In the illustrated embodiment the vane has a flat face 10 which is pivotally supported by shaft stubs 11 and 12 extending from the end 13. Affixed to the face 10 is a plate 14 which in practice may be a right angular plate with one portion secured to the face 10 as by fasteners 15.

In considering the operation of a vane such as shown in FIG. 1, reference is now made to FIG. 3 in which the fluid flow is illustrated by the arrow 16, the lines indicating the general flow pattern. It will be seen that the plate 14 breaks up the flow pattern of fluid so that a turbulence is created as it passes across the face of the vane, and a change in direction of the fluid occurs as illustrated by the flow line 17. In a usual butterfly valve there is normally an increase in the fluid velocity adjacent the upper edge of the vane as at 18 which means that near this point there is a lower pressure than would exist as, for example, in the median portion of the conduit as at point 19. From Bernoulli's hydraulic prinicples, the static pressure at point 18 is lower than at point 19 or at point 20 which creates a closing torque that has been referred to above. However, when the fluid changes direction by the presence of the plate 14, the eddy currents that are created reduce the velocity of fluid as for example at point 17, and therefore the static fluid pressure at point 17 is increased from that value which would be attained if the plate were not in position. The effect of the plate 14 being present is, therefore, to more nearly equalize the static pressures that exist across the face of the vane and reduce the closing torque that would normally oppose the force attempting to open the valve. This is illustrated diagrammatically in FIG. 2 where angle alpha is plotted against the coefficient of torque $C_t$. The solid curve represents the condition that is attained experimentally with the same vane in which the plate 14 has been eliminated while the dotted line illustrates the experimental results with the plate 14 in place. Graphically it can be appreciated that there is a considerable reduction in the torque coefficient that is needed to operate the butterfly vane with the plate 14 in place. The plotted coefficient is directly related to the actual torque since it can be proved experimentally that, for a given size valve, the total torque is proportional to a coefficient of torque and the pressure differential.

Since in many situations it is necessary for the butterfly valve to operate in both directions of fluid flow, for example, as in flood control applications, it is usual to have an analysis of the flow in the opposite direction. Reference is therefore made to FIG. 4 of the drawings where the flow is shown as being in the opposite direction as illustrated, for example, by the arrow 21. Here it will be found that relatively there is a higher static pressure at point 22 than at point 23. This situation, of course, creates the usual torque that tends to rotate the vane to closed position. Generally on the downstream side of the vane considerable turbulent flow takes place so that normally across the downstream face it is considered that the pressure is of a low nature and for analytical purposes we can say that it is similar to the pressure at point 23. However, in the instant case the plate 14 upsets the normal flow pattern passing through the aperture at 24 and in fact creates an eddy current flow that tends to cut in behind the plate 14 somewhat as illustrated by the line 25. This therefore tends to increase the normal low static pressure against the downstream face of the vane so that at a point such as 26 a greater static pressure is now present than was heretofore present without the plate 14 in place. This greater static pressure at point 26 tends to balance the pressure at point 22 and as illustrated in the diagrammatic view FIG. 2 again tends to bring the coefficient of torque down towards the base line.

Referring now to FIGS. 5 and 6 of the drawings, there is shown another embodiment of the invention in which two plates 14 and 14' have been placed at either edge of the butterfly vane, which plates serve to create a change in direction of the fluid across the face of the vane and a resultant lowering of the torque required for operating the vane. For example, with reference in FIG. 5 in which the fluid flow is as shown by arrow 28, there will not only be the change in direction of the fluid that was created as at point 17 in FIG. 3, but additionally a similar type of direction change will be created at point 29. Reverting temporarily to the previous discussion of FIG. 3, it will be recalled that at the point adjacent to the upper plate 14, the effective static pressure was increased from that previously experienced if the plate were missing. At the lower portion adjacent the plate 14', again the velocity of the fluid is affected by the direction change. The disturbance created by the plate 14' causes a reduction in the pressure on the lower part of the flat surface and an increase in pressure on the lower part of the back surface of the vane, both reducing the tendency of the vane to close.

In the reverse flow condition that is illusrtated in FIG. 6 in which the flow is diagrammed by the arrow 31, there would normally be a higher static pressure present at the point 32 than at the point 33, and similarly on the downstream side of the vane, comparatively speaking, there would be a lower static pressure adjacent the point 34 and a higher static pressure adjacent the point 35. The presence of the plates 14 and 14', therefore, will create an eddy current condition in the areas 34 and 35, and the higher pressure at the point 35 will be lowered by virtue of the eddy current, and the venturi effect passing adjacent the plate 14 which would normally create a low static pressure will be completely upset by the directional change imparted by plate 14 so that more nearly equal pressures are present at point 32 and 34 than would occur if the plate 14 was not in place.

The modifications that are shown in FIGS. 7, 8 and 9 of the drawings are still further variations of this same basic inventive thought, namely, that of creating a directional change in flow adjacent the leading and sometimes the trailing edges of a butterfly vane to upset the normal venturi effect that evidences itself between the edges of the butterfly vane and the wall of the conduit. Actually the offsetting of the vane along a half section thereof as illustrated in FIGS. 8 and 9 merely produces slightly different torque characteristics than that illustrated for example in the dotted line showing of FIG. 2. In reality what occurs is that the hump of the curve varies in position as related to the angle of opening and under some conditions of operation it is desirable to provide a vane in which the hump occurs at different points which can be created by utilizing the offset situation as illustrated.

It will of course be appreciated that the advantages of the instant invention are of more benefit under two conditions, first in large size butterfly valves rather than small size valves, and secondly in valves with high fluid velocities rather than low velocities. Some further test data which graphically illustrates the advantages secured by the invention are shown in FIG. 10. FIG. 10 is effectively a pressure diagram in which the broken line 50 represents the center of the butterfly valve or its axis of rotation and either side of this center line there has been plotted a pressure that was observed first on the upstream face and again on the downstream face, a conventional flat valve being illustrated by the solid line and the dotted line indicating the tests results of a shape similar to that shown on FIGS. 5 and 6. It will be observed that the integrated moments of the pressures over the areas of the upstream and the downstream faces about the shaft axis tend to cancel each other resulting in a low net hydrodynamic shaft torque in most all positions of the butterfly vane.

We claim:
1. A butterfly valve for controlling the flow of fluid through a conduit comprising a vane with closing edges on both sides of and parallel to an axis of support which passes through a central portion of the vane, the vane on at least one edge being provided with a discontinuity so as to divert the fluid on a side of the vane with such inequality as to lower the hydrodynamic torque required to rotate the vane about its axis, said discontinuity being in the form of a plate, flat on both sides that rises substantially vertically from the general extent of the vane adjacent to and spaced inwardly from at least one of the closing edges thereof.

2. A butterfly valve as in claim 1 wherein said discontinuity in is in the form of a pair of plates that rise substantially vertical from the general extent of the vane adjacent to and spaced inwardly from both of the closing edges thereof.

References Cited

UNITED STATES PATENTS

| | | | |
|---|---|---|---|
| 2,095,263 | 10/1937 | Moss | 251—305 X |
| 2,271,390 | 1/1942 | Dodson | 251—305 X |
| 3,049,335 | 8/1962 | Daumy et al. | 251—305 |
| 3,141,470 | 7/1964 | La Fontaine | 251—305 X |
| 3,176,704 | 4/1965 | De Palma | 251—305 X |

FOREIGN PATENTS

| | | |
|---|---|---|
| 1,233,654 | 5/1960 | France. |

M. CARY NELSON, *Primary Examiner.*

ROBERT C. MILLER, *Assistant Examiner.*

PO-1050
(5/69)

UNITED STATES PATENT OFFICE
CERTIFICATE OF CORRECTION

Patent No. 3,442,489      Dated May 6, 1969

Inventor(s) Francis H. Cary, et al.

It is certified that error appears in the above-identified patent and that said Letters Patent are hereby corrected as shown below:

> Column 1, in the heading, "The New York Air Brake Company, a corporation of New Jersey" should read -- General Signal Corporation, a corporation of New York -- .

SIGNED AND SEALED

MAR 10 1970

(SEAL)
Attest:

Edward M. Fletcher, Jr.
Attesting Officer

WILLIAM E. SCHUYLER, JR.
Commissioner of Patents